INVENTOR.
Richard R. Evans
Irvin W. Mahacek
BY Lawrence A. McKinney

Agent

United States Patent Office 2,780,361
Patented Feb. 5, 1957

2,780,361

SCUM SKIMMER

Richard R. Evans, Irvin W. Mahacek, and Lawrence A. McKinney, Tucson, Ariz., assignors to Infilco Incorporated, Tucson, Ariz., a corporation of Delaware Application November 13, 1952, Serial No. 320,234

15 Claims. (Cl. 210—51)

This invention relates to an apparatus for skimming the liquid surface of a circular clarifier, thickener, or the like, to remove floating matter such as scum, and particularly oil or grease, therefrom. For expediency, all such floating materials will be referred to herein sometimes as "scum."

It is an object of this invention to provide improved means for removing scum from the liquid surface of a circular tank.

Another object is to provide support means for an elongated scum-receiving member which extends radially across a circular tank. Another object is to provide such support means which are vertically adjustable so that the scum-receiving member can be leveled and adjusted relative to the liquid surface.

Another object is to provide an improved skimmer blade for a circular tank.

Another object is to provide for a circular tank equipped with a radial elongated scum-receiving pipe or trough, a flexible multi-section skimming blade, with the sections arranged to contact the leading edge of the pipe or trough simultaneously and to drop off the trailing edge of the pipe or trough sequentially.

Other objects will become apparent upon consideration of the description and the claims which follow.

In the treatment of liquid, and particularly of waste liquids, such as sewage, oily waste waters, and the like, settleable solids in suspension in the liquid are usually removed by settling in a clarifier or thickener. Customarily, such clarifiers or thickeners are provided with sludge-scraping means for moving the solids settled on the bottom of the tank to a sump or other sludge-collecting means, from where the sludge is removed to outside the tank. Lighter matter, and particularly oil and grease, do not subside, but rise to the surface of the liquid, forming a layer of scum which must be removed separately by a skimming mechanism. Such skimming mechanism comprises means for moving the floating matter over the liquid surface to one or more collecting points, and a receiving vessel at each collecting point, from which the floating matter can be removed to outside the tank.

In circular clarifiers the effluent is usually allowed to flow over a weir into an annular peripheral launder. To prevent the scum from flowing into the launder with the effluent, it is usual to place a scum baffle adjacent and inside the launder wall, the baffle extending a suitable distance above and below the normal liquid level in the tank. In circular clarifiers the skimming mechanism ordinarily comprises a skimming arm or truss rotatable about the vertical axis of the tank, and a skimmer blade attached to the arm and arranged at an elevation to penetrate the liquid surface. One or more scum boxes or troughs are ordinarily located adjacent the scum baffle and receive the scum collected by the skimmer blade.

In rectangular tanks a scum receiver has been used in the form of a horizontal pipe spanning the width of the tank near one of its ends and provided with one or more longitudinally extending slots through which the scum is pushed by the skimmer blade. The ends of the pipe are carried in bearings fixed to the opposed walls of the tank for rotary movement about its longitudinal axis from an inoperative position, where the slot or slots are above the liquid line, so as to prevent any flow into the pipe, to an operative position, where they are submerged. One end of the pipe is open and is connected to a discharge conduit leading to outside the tank through a port in the tank wall. Such a slotted pipe provides a more efficient scum receiver than the peripherally arranged scum troughs or boxes customarily used in circular tanks. With such a pipe the scum or oil need not be moved to, and collected at, or near, the periphery of the tank, but can be removed simultaneously over the entire width of the tank.

In rectangular basins it is relatively simple to support a scum withdrawal pipe of this type, as the bearings, which rotatably support the pipe, can be affixed to the opposite side walls of the basin. In a round clarifier, however, the inner end of the pipe cannot derive support from a wall due to the rotating parts customarily used in such clarifiers. In such a clarifier a support for the pipe must be shaped and positioned so that it is cleared by the rotating scraper truss, inlet well, and skimmer arm. It must be sufficiently strong to take the stresses imposed by a pipe of considerable length and weight, and it must provide for exact leveling of the pipe.

Another problem arising from the use of such a scum pipe in a round tank relates to the construction of the skimmer blade. In a rectangular tank with a scum withdrawal pipe spanning the tank, the skimmer blade only approaches the scum pipe, but need not pass over it to continue its travel. When such a pipe is used in a round tank, however, the skimmer blade must pass over the pipe, which is mounted directly across its path of rotation.

In our new scum removal apparatus we have incorporated a scum receiver of this general type for cooperation with a skimming assembly rotatable about the vertical axis of the tank. One aspect of our invention relates to the adaptation of such a scum receiver to the structural conditions imposed by the rotating elements of a round clarifier or thickener. Another aspect of the invention relates to structural changes in a rotating skimmer blade to adapt it to use with a scum receiver of this general type.

Our invention will be more readily understood by reference to the drawings which form a part hereof and wherein similar elements in the several figures are designated by like reference characters.

Figure 9 is a vertical cross-sectional view of a modified scum receiver.

Figure 1:
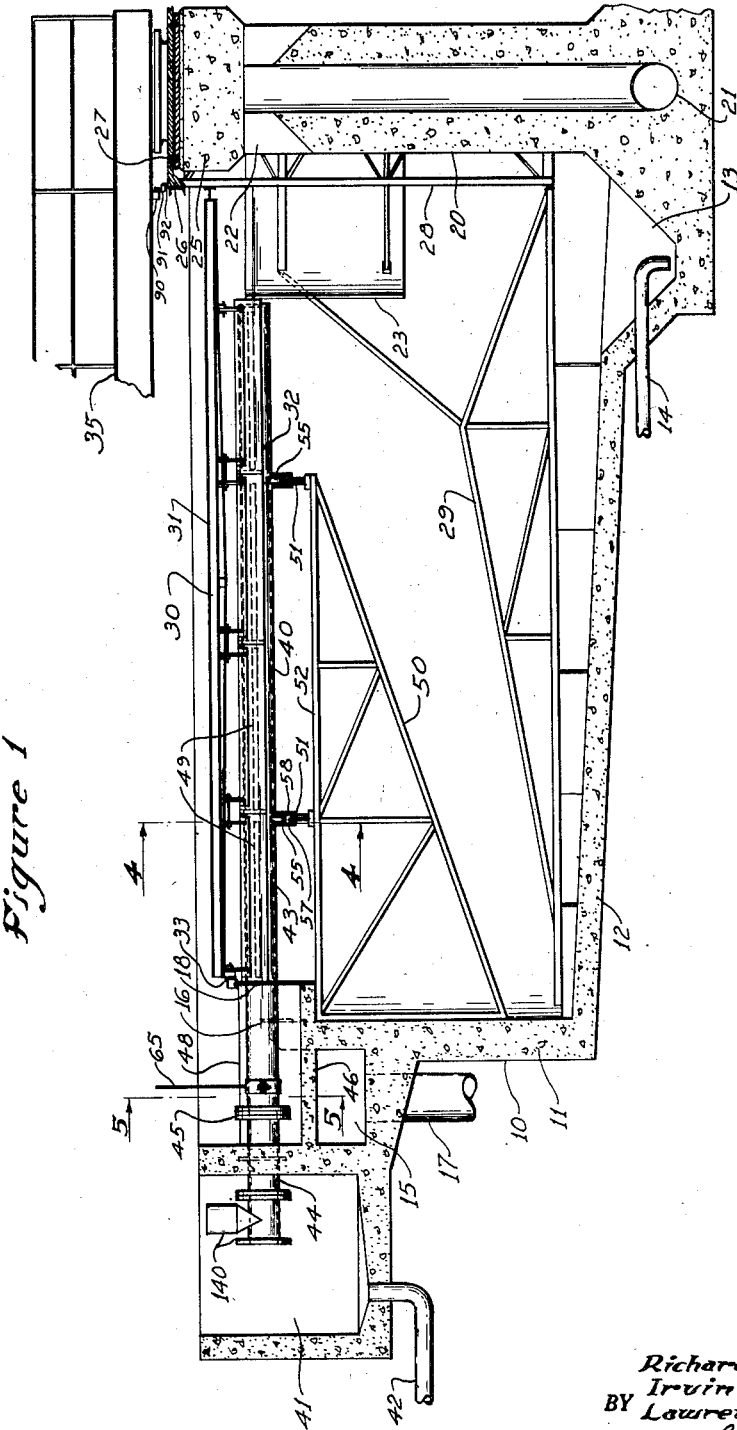
Figure 1 is a partial vertical cross-sectional view of a conventional circular clarifier with a skimming mechanism according to the invention.
Figure 2:
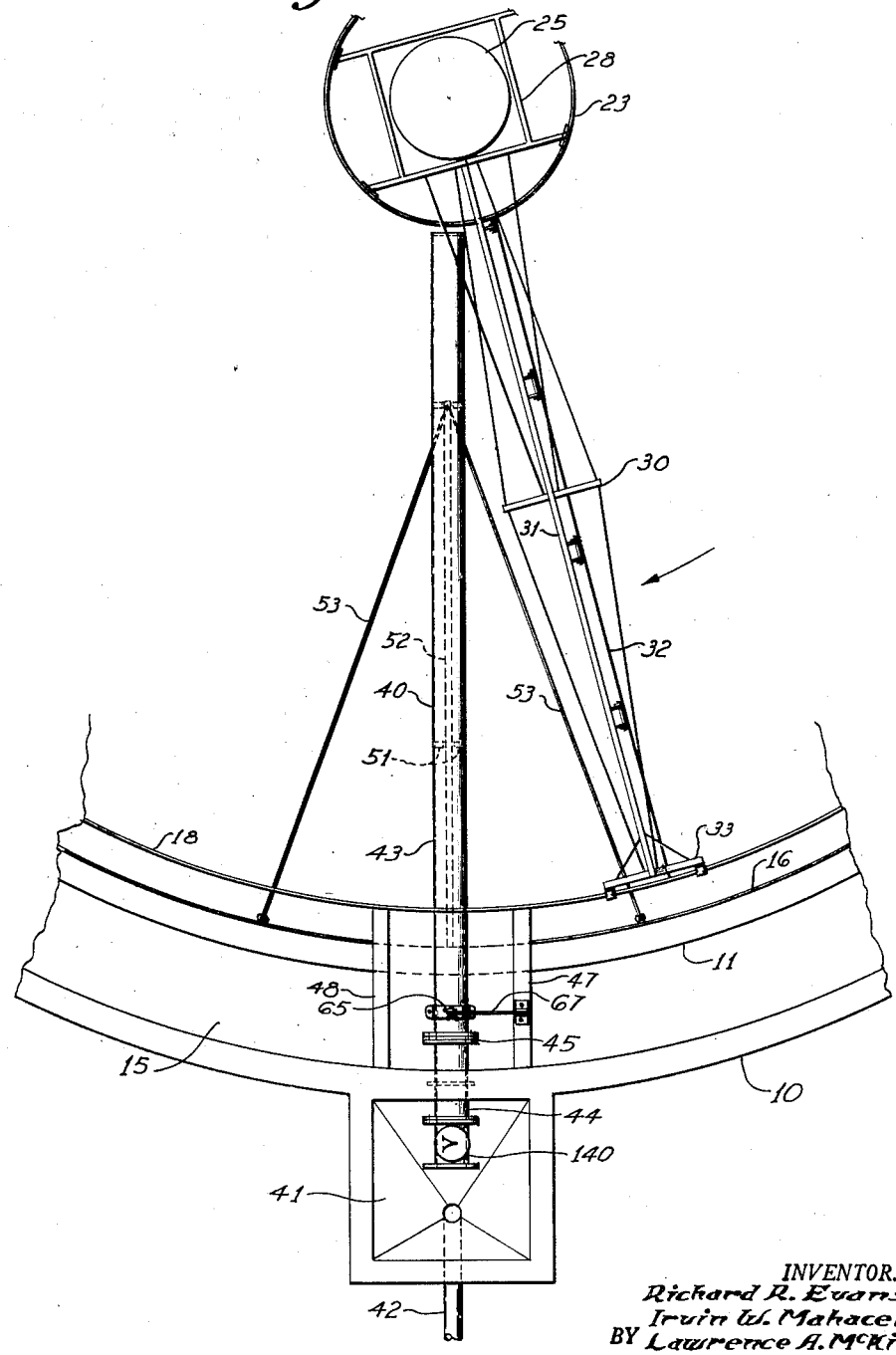
Figure 2 is a partial plan view, with the walkway removed, of the clarifier and skimming mechanism of Figure 1, showing the skimmer arm and blade approaching the scum pipe in a clockwise direction of rotation.

In Figures 1 and 2 the invention is shown applied to a conventional clarifier comprising a tank 10 of generally circular cross-section, having a wall 11 and a bottom 12 which is slightly inclined toward the center of the tank. A sludge sump 13 is provided adjacent the center of the tank, and a sludge outlet conduit 14 leads from the sump 13. The upper part of the wall 11 is surrounded by a launder 15, into which the clarified liquid flows over a weir 16. An effluent conduit 17 leads from the launder 15. A scum baffle 18 is mounted in the tank, spaced from the wall, and extends from an elevation above to an elevation below the crest of the weir 16.

Figure 7:
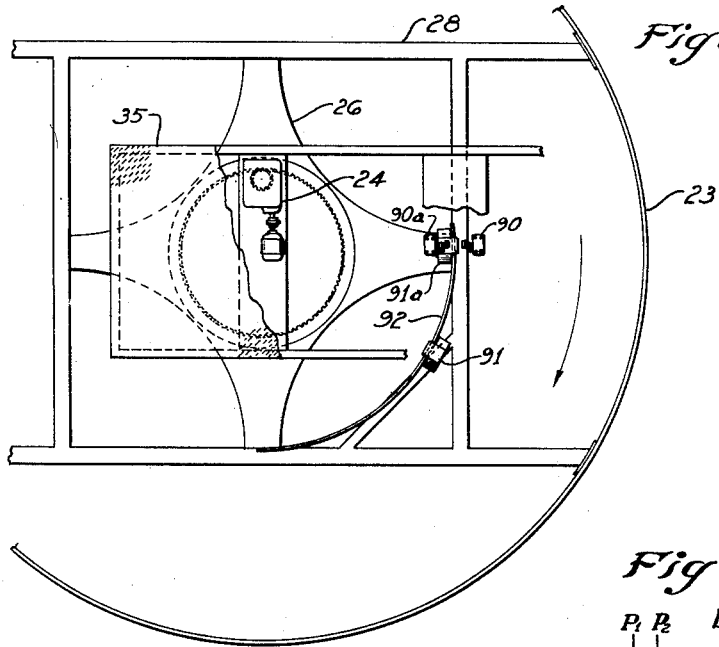
Figure 7 is a plan view of the actuating means for the turning mechanism of Figure 6.

Axially aligned in the tank 10 is a column 20, which extends from the bottom 12 to an elevation well above the crest of the weir 16. The column 20 serves as support for the rotating parts in the tank 10 and may also contain the inlet conduit 21. Liquid entering through conduit 21 is discharged through ports 22 in the column 20 into an inlet well 23, which directs the flow downwardly. On the top of the column 20 a turntable support 25 is mounted on which a turntable 26 is rotatably supported on a suitable bearing 27. A cage 28 is affixed to the turntable 26 and supports the inlet well 23, a scraper assembly 29, and a skimming assembly 30. The skimming assembly 30 comprises a skimmer arm or truss 31, and a skimmer blade 32 attached thereto and arranged with its lower edge penetrating the liquid surface in the tank. The outer end of the skimmer arm 31 is supported on a carriage 33, which rides on the scum baffle 18. The cake 28 may be driven by a motor-reducer 24 through a conventional gear and pinion connection, as diagrammatically shown in Figure 7. Rotation of the cage 28 rotates the inlet well 23, scraper assembly 29, and skimming assembly 30. A bridge or walkway 35 extends radially from the periphery of the tank 10 to the column 20 and is supported on the outside wall of the launder 15 and on the column 20.

A scum-receiving member 40, shown in Figures 1 to 5 as a pipe, extends from closely adjacent the rotary inlet well 23 radially across the tank 10, the launder 15, and through a port in the outer wall of the launder into a scum sump 41. A sum outlet conduit 42 leads from the sump 41. The pipe 40 has two sections, 43 and 44, the section 43 being rotatable about its longitudinal axis and the section 44 being fixedly supported. The two sections are jointed togther by a swivel joint 45. To prevent pollution of the clarified liquid in the launder 15 by scum leaking through the joint 45, the portion of the launder through which the pipe 40 extends is completely isolated from the balance of the laundry by a floor 46, extending under the pipe from the outer wall of the launder to the scum baffle 18, and partitions 47 and 48, extending upwardly from the bottom 46 to the elevation of the top of the scum baffle 18. The wall 11 and weir 16 are cut out between the partitions 47 and 48, and the scum baffle 18 has a passage slightly larger than the pipe 40, through which the pipe is extended.

The inner end of pipe 40 is closed, and its outer end is open to provide for free flow of scum therefrom into the scum sump 14. The pipe 40 has a ported area, parallel to its longitudinal axis, which may be in the form of a continuous slot, but preferably comprises several spaced slots 49, as shown in Figure 1.

To support the pipe 40, we provide a cantilever truss 50 and a plurality of bearings 51, mounted on the horizontal top cord 52 of the truss 50 and spaced along the pipe 40. While only two such bearings 51 are shown in Figure 1, it will be obvious that their number will depend on the length of the pipe 40 and cord 52 of the truss. The truss 50 is affixed to, and extends from, the wall 11 underneath the pipe 40 and is braced by tension rods 53, as shown in Figure 2.

Figure 4:
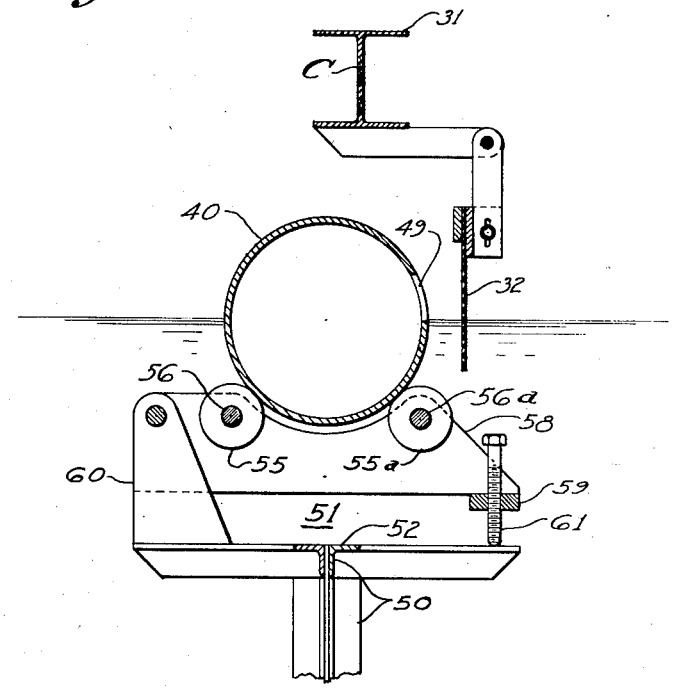
Figure 4 is a vertical cross-sectional view, on an enlarged scale, along line 4—4 of Figure 1, showing the adjustable support of the scum pipe and the support of the skimmer blade.

As best shown in Figure 4, each bearing 51 comprises a pair of rollers 55 and 55a, mounted with their axes parallel to the longitudinal center line of the pipe 40 and tangent to the pipe on opposite sides of its vertical center line and below the horizontal center line. For each set of rollers 55 and 55a a leveling adjustment is provided. The rollers are pinned by pins 56 and 56a between bearing plates 57 and 58, which are rigidly connected to each other by a bottom plate 59. One side of the bearing bracket thus formed is hinged to a lug 60 mounted on the top cord 52 of the cantilever truss 50, and the other side is fitted with an adjusting screw 61, whereby the rollers can be slightly raised or lowered to level the pipe 40 and adjust it with respect to the liquid surface.

Figure 5:
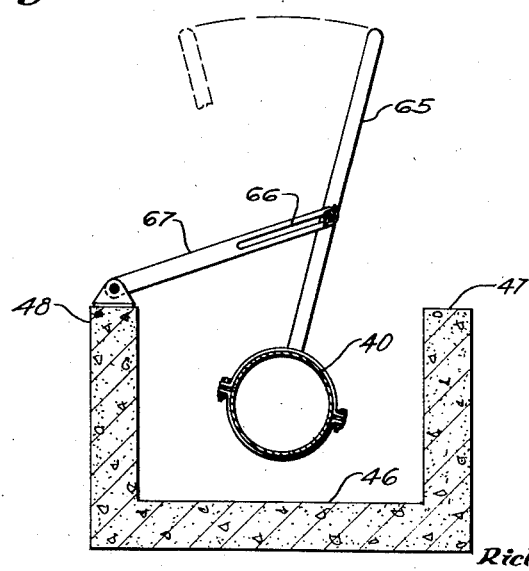
Figure 5 is a vertical cross-sectional view along line 5—5 of Figure 1.

With such a support the pipe 40 is rotatable about its longitudinal axis from an inoperative position, where the slots 49 are above the liquid surface, to an operative position, where the slots 49 are below the liquid surface. If desired, the pipe can also be held in operative position at all times and be rotated only to exactly position the slots with respect to changes in the liquid level. Rotation of the pipe 40 can be effected by any suitable means, such as a handle 65 affixed to the pipe 40. As shown in Figure 5, the handle 65 can be moved to, and locked in, the proper position along the slot 66 of a connecting rod 67, which is pivotally mounted on one of the walls 47 or 48. The slot 66 is of a length to permit the handle 65 to move through an arc corresponding to the maximum distance between the operative and inoperative positions of the pipe 40.

To enable the skimmer blade 32 to pass over the scum pipe 40, the blade must be hinged to the skimmer arm 31, or be flexible, and preferably is both hinged and of flexible material. In relatively small tanks the well known expedient of a hinged, flexible blade may provide satisfactory operation. In larger tanks, however, more is needed to obtain equal skimming of all parts of the basin and to insure a long life of the blade. The construction and mounting of a new skimmer blade, which satisfies these requirements, is shown in Figures 3 and 4.

To provide satisfactory scum removal, the skimmer blade must contact the leading edge of the scum pipe 40 throughout its entire length simultaneously. With the center line of the pipe 40 on a radius of the basin, the leading edge of the pipe is not on a radius. Therefore, in order to obtain simultaneous contact of all portions of the leading edge, the blade 32 is offset from the center line C of the skimmer arm 31 by half the diameter of the pipe 40, as shown in Figure 4. However, when the skimmer blade leaves the trailing edge of the pipe 40, it leaves the outside end of the pipe first, and on large basins considerably before it leaves the inside end, as clearly shown in Figure 3, where the inside end of the blade still rides on the pipe 40 and the outside end is spaced by a considerable angle from the scum pipe. If under these circumstances a single, rigid blade were used, this sector of the liquid surface behind the scum pipe would never be skimmed; if a single, flexible blade were used, the inner portion of the blade would be curled upwardly and the blade be subject to excessive wear. To overcome these difficulties, we use a multi-sectional flexible skimmer blade.

Figure 3:
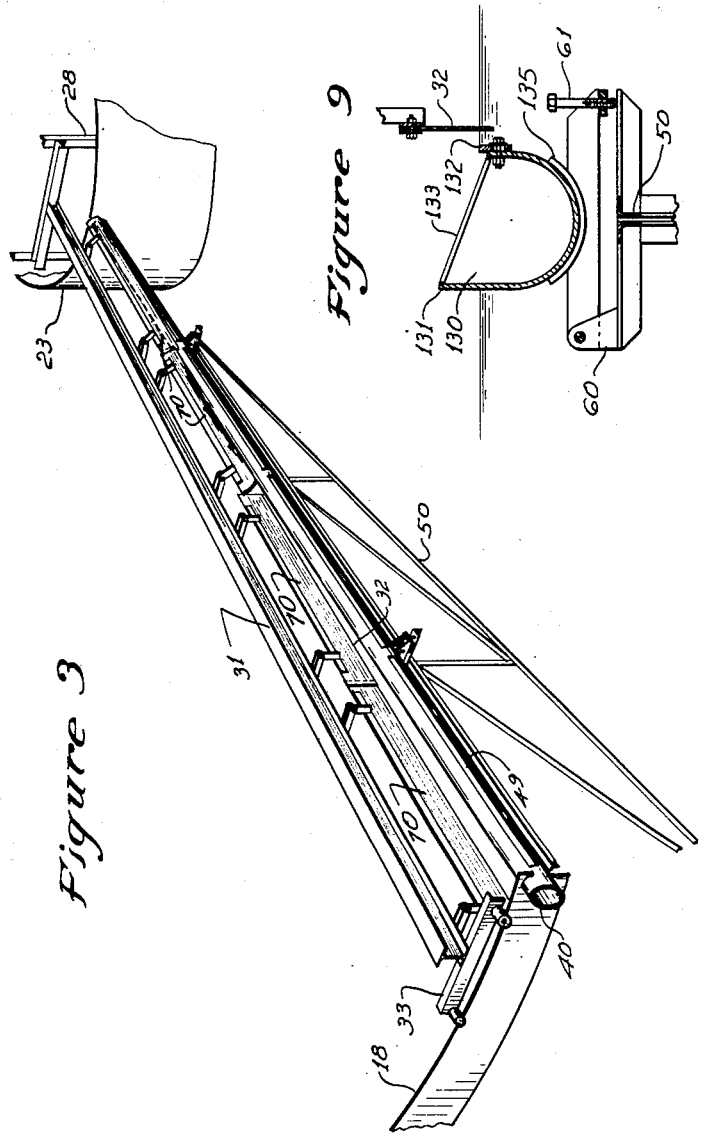
Figure 3 is a perspective view of the scum pipe and skimmer blade, showing the positions of the blade sections as they leave the trailing side of the scum pipe.

As shown in Figure 3, each section 70 of the blade 32 is separately hinged to the skimmer arm 31 at two points near opposite ends of the section. To prevent streaks of oil from remaining on the liquid surface between the individual blade sections, the sections are made of sufficient length that their adjacent ends overlap, as clearly shown in Figure 3. With this construction individual sections 70 drop off the trailing edge of the scum pipe 40 in sequence from the outermost to the innermost section, and as each section drops off the pipe, it is immediately in position to skim the liquid surface, without exercising any stress on other sections which still ride on the pipe. Thus, all portions of the liquid surface are uniformly skimmed, and a long life of the skimmer blade is insured.

Figure 6:
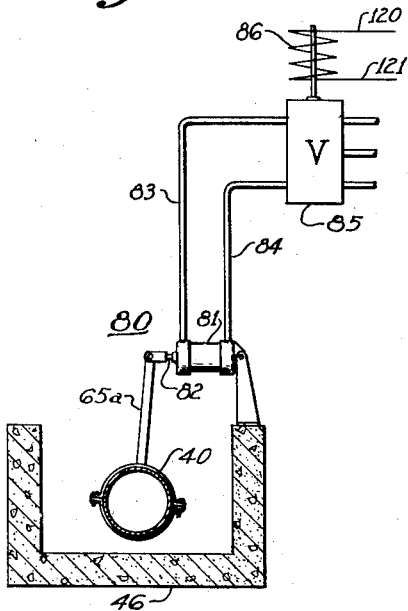
Figure 6 is a diagrammatical elevation, partly in section, of the scum pipe with its turning mechanism.

In many plants the scum accumulated on the liquid surface is withdrawn only at relatively long intervals, such as once per day, and in such cases it will be satisfactory to effect rotation of the pipe 40 manually. In plants where it is necessary to remove scum at relatively short intervals, or where no personnel is available for operation of the scum removal pipe, it may be necessary to provide automatic means for positioning the pipe at predetermined intervals to its operative and inoperative positions, respectively. Such automatic means may take various forms and will comprise a pipe-turning mechanism, which may be operated hydraulically, pneumatically, mechanically, or electrically, and means for controlling operation of the pipe-turning mechanism. For purposes of exemplification and illustration, we have shown in Figure 6 a turning mechanism 80 for the pipe 40 in the form of a hydraulic cylinder 81, whose piston rod 82 is pinned to the handle 65a. The opposite ends of the hydraulic cylinder are connected through lines 83 and 84, respectively, to a solenoid operated valve 85. When the circuit through the coil of the solenoid 86 is closed, by means to be described below, the valve 85 is positioned to connect its supply line with the line 83 leading to the left hand end of the cylinder 81 (as seen in Figure 6), and to exhaust pressure from the right hand end of the cylinder through the line 84, to move the rod 82 inwardly, and rotate the pipe 40 to lower the slots 49 into the liquid. Conversely, when the circuit through solenoid 86 is broken, the right hand end of the cylinder 81 is connected to supply, and the left hand end is exhausted, to move the piston rod 82 outwardly and turn the pipe 40 to its inoperative position.

For controlling the operation of the turning mechanism 80 we provide two electric limit switches 90 and 90a, which may be supported in any suitable manner, such as from the walkway 35 (Figure 1), and two cams 91 and 91a, which are fixed on a circular track 92, which in turn is affixed to, and rotates with, a rotating member, such as, for example, the cage 28. Cams 91 and 91a are in circular alignment with the switches 90 and 90a, respectively. Cam 91 is placed radially on the track 92, so that it will contact the arm of its limit switch 90 at the predetermined point of travel of the skimmer blade 32, where the pipe-turning mechanism 80 is to be actuated to turn the pipe 40 to operative position. Depending on the quantity of scum to be removed, this point may be spaced at any desired angle up to about 90° from the leading side of the pipe 40. Cam 91a is placed in a radial position on the track 92, where it will contact the arm of its limit switch 90a at the predetermined point where the pipe-turning mechanism 80 is to be actuated to rotate the pipe 40 to inoperative position.

Figure 8:
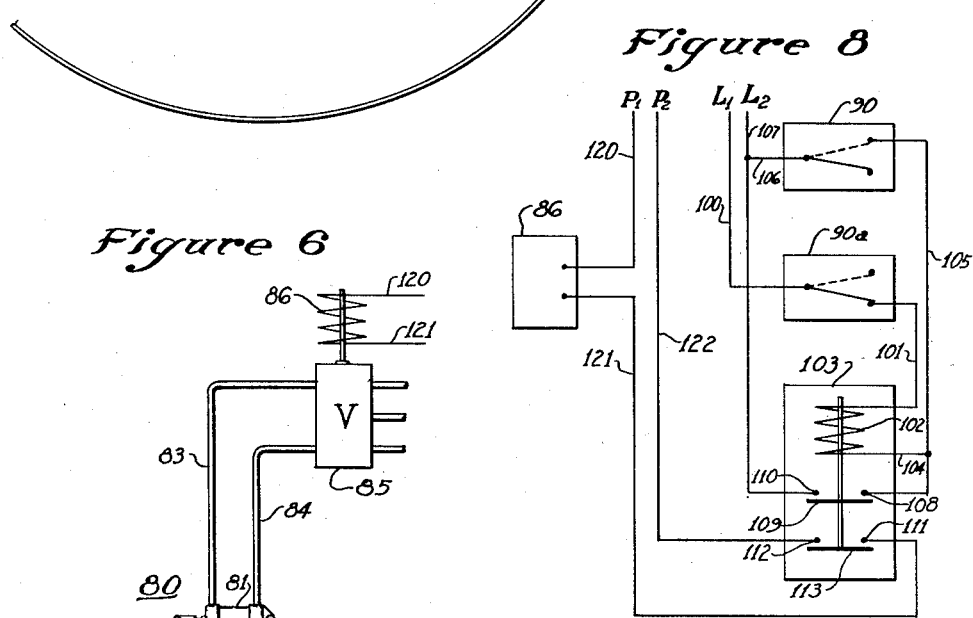
Figure 8 is a wiring diagram for the turning mechanism and actuating means of Figures 6 and 7.

Figure 8 is a wiring diagram for limit switches 90 and 90a and the solenoid 86. Limit switch 90 is of the normally open contact type, and limit switch 90a is of the normally closed contact type. When the cam 91 momentarily closes its associated switch 90, a circuit is closed from source of power L1 through conductor 100, switch 90a, conductor 101, coil 102 of relay 103, conductors 104 and 105, switch 90, conductors 106 and 107 to L2. This circuit is immediately broken when the cam 91 has passed the switch 90 and this switch opens. However, energizing of coil 102 of relay 103 establishes a holding circuit from L1 through conductor 100, switch 90a, conductor 101, coil 102, conductors 104 and 105, contact 108, pole 109, and contact 110 of relay 103, and conductor 107 to L2. This circuit remains closed after the circuit through switch 90 is broken.

As long as the coil 102 of relay 103 is energized, the contacts 111 and 112 of relay 103 are bridges by pole 113. This closes a circuit in which the coil of solenoid 86 is connected as follows: from source of power P1, through conductor 120, the coil of solenoid 86, conductor 121, contact 111, pole 113, and contact 112 of relay 103, and conductor 122 to source of power P2. Closing of this circuit operates the hydraulic cylinder 81 to rotate the pipe 40 to operative position, as described above. This circuit remains closed, and the pipe, therefore, in operative position, until the cam 91a reaches the arm of its limit switch 90a and the holding circuit through the relay 103 is broken. When the relay 103 opens, the circuit through the solenoid 86 is broken, and the hydraulic cylinder 81 is operated to rotate the pipe 40 to inoperative position, as described above.

When using automatic means for rotating the pipe 40, such as described above, in connection with a tank where the liquid level is allowed to vary within relatively wide limits, it may be necessary to control the extent of downward movement of the slots 49 in accordance with variations in the liquid level in the tank 10. Any liquid level responsive means, such as a float, can be used to position a stop in the path of downward rotation of pipe 40. Such means are well known in the art and, therefore, need not be shown or described herein.

Figure 9 shows a modified form of the scum-receiving member. In this embodiment the scum receiver is in the form of an open top trough 130. The edge 131 of the trailing side of the trough 130 is extended to a higher elevation than the adjustable weir plate 132 at the leading edge. A plurality of brackets, one of which is shown at 133, connect the edges 131 and 132, to strengthen the structure of the trough and guide the skimmer blade as it passes over the trough. The trough 130 may be rotatably supported and may be rotated, manually or automatically, in the same manner as described in connection with the pipe 40. For purposes of exemplification, the trough 130 is shown in Figure 9 as fixed to a non-rotatable support 135. The support 135 should, however, be vertically adjustable to permit leveling of the trough 130 and adjusting the overflow 132 relative to the liquid surface. The adjustment shown in Figure 9 is the same as shown in Figure 4 and described in connection therewith.

While the pipe 40 has been shown and described as rotatable about its longitudinal axis, we also contemplate supporting the pipe 40 in the manner shown in Figure 9. When the pipe 40 or trough 130 are supported fixedly, they can be made in one piece, and the floor 46 and partitions 47 and 48 can be omitted, as there will be no danger of leakage through any joint. In many cases this simplified construction will be satisfactory. However, when the scum-receiving pipe or trough is continuously held in operative position, a valve 140, such as shown in Figures 1 and 2, should be provided at its outer end to prevent continuous withdrawal of liquid through the pipe or trough. Such a valve can be operated manually or automatically. In the latter case means, such as described above for the automatic positioning of pipe 40, may be used for automatically opening and closing the valve 140 at the proper times.

It will be obvious to those skilled in the art that modifications of the invention hereinabove set forth can be made without departing from the scope and spirit of the invention. Thus, for example, the clarifier or thickener in which the skimming assembly is used need not be round, but can be square. Accordingly, we do not wish to limit ourselves to the exact embodiments shown and described for purposes of exemplification and illustration.

We claim:

1. A device for removing scum from the liquid surface of a tank having a bottom and a cylindrical upstanding wall, support means within said tank rotatable about the vertical axis of said tank, said device including a skimmer arm supported by said support means and a skimmer blade hinged to, and rotatable with, said arm, and a stationary hollow scum-receiving member being supported in, and extending across, said tank from closely adjacent said support means through said wall, said member having a closed inner and an open outer end, overflow means into said member in the path of travel of said blade, and means for positioning said overflow means with regard to the liquid surface in said tank, characterized in that said blade comprises a plurality of sections, each separately hinged to said arm, said sections being lengthwise aligned in parallel relationship to said arm with their adjacent ends overlapping one another.

2. The apparatus of claim 1 comprising also a valve connected with the open end of said hollow member.

3. A device for removing scum from the liquid surface of a round tank having a bottom and a wall extending upwardly therefrom, said device including means rotatable about the vertical axis of said tank, a skimmer blade supported by, and rotatable with, said rotatable means, scum-receiving means extending across the path of rotation of said blade and comprising a stationary hollow member extending horizontally from closely adjacent to, but spaced from, said rotatable means through said wall, said member having a closed inner end and an open outer end, and overflow means into said member extending at least part of its length on its leading side relative to the rotation of said blade, and means for rotating said member about its longitudinal axis, the combination with said member of a cantilever truss affixed to, and extending inwardly from, said wall subjacent said member, a plurality of support members spaced along, and carried by, said truss and rotatably supporting said hollow member, and means for vertically adjusting each of said support members to level said hollow member and position said overflow means with regard to the liquid surface, said blade comprising a plurality of overlapping sections.

4. In a device for removing scum from the liquid surface of a tank having a round boundary wall and support means rotatable about the vertical axis of said tank, said device including a skimmer blade supported by, and rotatable with, said support means, the combination with said blade of scum-receiving means in the path of rotation of said blade and comprising a hollow member extending horizontally from closely adjacent said support means through said boundary wall, said member having a closed inner end and an open outer end, and overflow means into said member extending at least part of its length, a cantilever truss affixed to, and extending inwardly from, said boundary wall subjacent said member, a plurality of bearings spaced along, and supported by, said cantilever truss and rotatably supporting said member, each of said bearings including a pair of rollers arranged on opposite sides of said member with their axes parallel to the longitudinal axis of said member, means for vertically adjusting said rollers to level said member and position said overflow means with regard to the liquid surface, and means for rotating said hollow member about its longitudinal axis.

5. The apparatus of claim 4, wherein said member is a pipe, and said overflow means is a plurality of slots parallel to the longitudinal axis of said pipe.

6. The apparatus of claim 4, wherein said member is an open top trough, the leading edge of said trough in the direction of rotation of said blade being at a lower elevation than its trailing edge.

7. A device for skimming the liquid surface of a round tank, said device including a skimmer arm rotatably supported in, and extending radially across, said tank, blade means hinged to said arm and depending therefrom in parallel relationship thereto, a stationary hollow scum-receiving member extending radially across said tank in the path of rotation of said blade means, and an overflow into said member extending parallel to its longitudinal axis, characterized in that said blade means comprises a plurality of flexible blade sections, said sections being hinged to said skimmer arm and arranged offset from the center line of said skimmer arm by about half the diameter of said scum-receiving member, said sections being lengthwise aligned with their adjacent ends overlapping one another.

8. A device for removing scum from the liquid surface of a tank of the type having a round boundary wall and rotatable centrally disposed means axially aligned with said boundary wall, said device including an arm rotatable by rotation of said rotatable means, a flexible skimmer blade hinged to said arm and depending from said arm over substantially its length, and scum-receiving means extending in the path of rotation of said skimmer blade and comprising a hollow member extending radially and horizontally across said tank from closely adjacent to, but spaced from, said rotatable means through said boundary wall, said member having a closed inner end and an open outer end, and overflow means into said member parallel to the longitudinal axis of said member, characterized by a cantilever truss affixed to, and extending inwardly from, said boundary wall subjacent said member, a plurality of bearings spaced along, and supported by, said truss and rotatably supporting said member, and means for vertically adjusting each of said bearings to level said member, and further characterized in that said skimmer blade comprises a plurality of separate blade sections overlapping one another and offset from the center line of said arm.

9. In a tank having a boundary wall and means rotatable about its vertical axis, means establishing a normal liquid surface in said tank, a skimmer arm rotatable with said rotatable means and extending therefrom radially, a flexible blade hinged to said skimmer arm, a hollow scum-receiving member extending radially and horizontally from closely adjacent said rotatable means through said boundary wall, said member being arranged in the path of rotation of said blade, and having a closed inner end and an open outer end and an overflow at its leading side relative to the direction of rotation of said blade, means for receiving scum from said outer end of said hollow member, and means for rotating said member about its longitudinal axis, support means for said member comprising a cantilever truss affixed to, and extending radially from, said boundary wall subjacent said member, a plurality of bearings supported by said truss and supporting said member, each bearing comprising a pair of rollers having their axes parallel to the longitudinal axis of said member and tangent with the member at opposite sides thereof and below its horizontal axis, and means for adjusting said rollers vertically, including a bracket assembly comprising two bearing plates, said rollers being pinned between said bearing plates, and a bottom plate rigidly attaching said bearing plates to each other, one side of said bracket assembly being hingedly supported on said truss, and its other side being fitted with an adjusting screw.

10. In a tank having a round boundary wall and a co-axial rotatable wall, means establishing a normal liquid surface in said tank, a skimmer arm rotatable with said rotatable wall and extending therefrom radially, a flexible blade hinged to said skimmer arm, a pipe extending radially and horizontally from closely adjacent said rotatable wall through said boundary wall, said pipe being arranged in the path of rotation of said blade, and having a closed inner end and an open outer end and a slotted area through which scum is pushed by said blade, means for receiving scum from said outer end of said pipe, and means for rotating said pipe about its longitudinal axis, support means for said pipe comprising a cantilever truss affixed to, and extending radially from, said boundary wall subjacent said pipe, a plurality of bearings supported by said truss and supporting said pipe, each bearing comprising a pair of rollers having their axes parallel to the longitudinal axis of said pipe and tangent with the pipe at opposite sides thereof and below its horizontal axis, and means for adjusting said rollers vertically, including a bracket assembly comprising two bearing plates, said rollers being pinned between said bearing plates, and a bottom plate rigidly attaching said bearing plates to each other, one side of said bracket assembly being hingedly supported on said truss, and its other side being fitted with an adjusting screw.

11. In a device for removing scum from the liquid surface of a tank of the type having a round boundary wall, and rotatable centrally disposed means concentric with said boundary wall, said device including a skimmer blade extending radially across said tank and rotatable by rotation of said rotatable means, an elongated open top trough extending horizontally and radially from closely adjacent said rotatable means in the path of rotation of said blade, said trough having a closed inner end and an open outer end, and an overflow on its leading side relative to the rotation of said blade, the trailing edge of said trough being at a nigher elevation than said overflow, and means for withdrawing the discharie of said open end, the combination with said trough of an adjustable weir plate forming said overflow, a cantilever truss supported by, and extending from, said boundary wall subjacent said trough, a plurality of bearings carried by said truss and rotatably supporting said trough at spaced points, and means for vertically adjusting said bearings to level said trough and adjust it relative to the liquid surface.

12. The apparatus of claim 11 wherein each of said bearings includes two rollers having their axes parallel to the longitudinal axis of said trough and tangent with said trough on opposite sides thereof below the horizontal center line of said trough.

13. In a device for removing scum from the liquid surface of a tank having a round boundary wall and support means rotatable about its vertical axis, said device including a skimmer blade supported by, and rotatable with, said support means, and a hollow scum-receiving member extending horizontally and radially across the path of rotation of said blade from adjacent said support means through said wall, said member having a closed inner and an open outer end, and an overflow into said member extending at least part of its length on its leading side relative to the direction of rotation of said blade, the combination with said member of a cantilever truss affixed to, and extending inwardly from, said wall subjacent said member, a plurality of bearings spaced along, and supported by said truss, and supporting said member rotatably about its horizontal axis, means for rotating said member, and control means controlling operation of said last mentioned means to rotate said member to, and hold it in, operative position, with said overflow below the liquid surface, during a predetermined portion of each rotation of said blade, and thereafter return it to, and hold it in, inoperative position, with said overflow above the liquid surface, during the balance of each rotation of said blade.

14. The apparatus of claim 13 wherein said control means comprises an electrically operated element operatively connected with said means for rotating said member, a first cam and a second cam supported by said rotatable support means at points spaced by an angle corresponding to said predetermined portion of rotation, a normally open switch and a normally closed switch mounted on a radius of said tank, said first cam being operative to close said normally open switch on passing it, and said second cam being operative to open said normally closed switch on passing it, a power circuit through said switches, a second power circuit through said electrically operated element, and means for closing said second power circuit when said first cam closes said normally open switch, and opening said second power circuit when said second cam opens said normally closed switch.

15. A device of the type described comprising an elongated hollow member disposed in a substantially horizontal plane, said member having at least one opening in the upper portion thereof, an elongated support disposed above said member and rotatable about a vertical axis located adjacent one end of said member, the longitudinal axis of said member passing through said vertical axis, a blade carried by said support and extending for substantially the length of said hollow member and adapted to contact the leading edge of said member over its entire length simultaneously and to ride over said upper portion of said member as said support passes over said member, said blade being offset from the centerline of said support by half the breadth of said hollow member, said blade comprising a plurality of sections separately hinged to said support, said sections being lengthwise aligned in parallel relationship to said support with their adjacent ends overlapping one another.

References Cited in the file of this patent

UNITED STATES PATENTS

| | | |
|---|---|---|
| 2,220,959 | Jennings | Nov. 12, 1940 |
| 2,242,139 | Munroe | May 13, 1941 |
| 2,248,177 | Karlstrom | July 8, 1941 |
| 2,249,049 | Sayers et al. | July 15, 1941 |
| 2,253,500 | Arango | Aug. 26, 1941 |
| 2,264,912 | Kupper | Dec. 2, 1941 |
| 2,279,970 | Coe | Apr. 14, 1942 |
| 2,427,092 | Kamp | Sept. 9, 1947 |
| 2,455,338 | Lind | Nov. 30, 1948 |
| 2,611,489 | Scott | Sept. 23, 1952 |
| 2,695,710 | Gibbs | Nov. 30, 1954 |